United States Patent
Seo et al.

(10) Patent No.: US 9,554,391 B2
(45) Date of Patent: Jan. 24, 2017

(54) METHOD FOR MITIGATING INTERFERENCE WHEN CHANGING USE OF DYNAMIC RESOURCE IN WIRELESS COMMUNICATION SYSTEM, AND DEVICE THEREFOR

(71) Applicant: LG ELECTRONICS INC., Seoul (KR)

(72) Inventors: Hanbyul Seo, Seoul (KR); Seungmin Lee, Seoul (KR); Byounghoon Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/763,089

(22) PCT Filed: Mar. 4, 2014

(86) PCT No.: PCT/KR2014/001757
§ 371 (c)(1),
(2) Date: Jul. 23, 2015

(87) PCT Pub. No.: WO2014/137130
PCT Pub. Date: Sep. 12, 2014

(65) Prior Publication Data
US 2015/0358977 A1 Dec. 10, 2015

Related U.S. Application Data

(60) Provisional application No. 61/774,568, filed on Mar. 7, 2013, provisional application No. 61/808,194, filed
(Continued)

(51) Int. Cl.
*H04W 72/00* (2009.01)
*H04W 72/08* (2009.01)
(Continued)

(52) U.S. Cl.
CPC ............ *H04W 72/082* (2013.01); *H04J 11/00* (2013.01); *H04L 5/0044* (2013.01); *H04L 5/0073* (2013.01);
(Continued)

(58) Field of Classification Search
CPC .... H04L 5/1469; H04L 5/0044; H04L 5/0073; H04L 5/0007; H04L 1/0038; H04W 72/00; H04W 52/267; H04W 72/082; H04W 52/243; H04W 52/00; H04W 52/20; H04W 52/146; H04J 11/00; H04B 7/0486; Y02B 60/50
(Continued)

(56) References Cited

U.S. PATENT DOCUMENTS 6,856,812 B1 * 2/2005 Budka .................. H04W 52/20
370/318
2007/0129094 A1 * 6/2007 Jeong .................. H04W 52/146
455/522
(Continued)

FOREIGN PATENT DOCUMENTS

KR 10-2007-0059666 6/2007
KR 10-0765892 10/2007
(Continued)

OTHER PUBLICATIONS

PCT International Application No. PCT/KR2014/001757, Written Opinion of the International Searching Authority dated Jun. 3, 2014, 15 pages.
(Continued)

*Primary Examiner* — Mahendra Patel
(74) *Attorney, Agent, or Firm* — Lee Hong Degerman Kang Waimey

(57) ABSTRACT

The present application discloses a method whereby a base station transmits/receives signals to/from user equipment in
(Continued)

a wireless communication system. More specifically, the method comprises the steps of: applying one of at least one candidate resource setting as a resource setting for the signal transmission/reception; and transmitting/receiving signals to/from the user equipment in accordance with the applied resource setting, the method being characterized by: decreasing transmission power for a downlink signal if the downlink signal is transmitted, in a resource designated for uplink signal reception from the user equipment according to a predetermined reference resource setting, to the user equipment according to the applied resource setting; and increasing transmission power for an uplink signal or decreasing the coding rate of the uplink signal if the uplink signal is received, in a resource designated for downlink signal transmission to the user equipment according to the reference resource setting, from the user equipment according to the applied resource setting.

6 Claims, 15 Drawing Sheets

Related U.S. Application Data on Apr. 3, 2013, provisional application No. 61/809,873, filed on Apr. 8, 2013.

(51) Int. Cl.
| | |
|---|---|
| *H04W 52/24* | (2009.01) |
| *H04J 11/00* | (2006.01) |
| *H04L 5/14* | (2006.01) |
| *H04W 52/00* | (2009.01) |
| *H04W 52/26* | (2009.01) |
| *H04L 5/00* | (2006.01) |

(52) U.S. Cl.
CPC ............ *H04L 5/1469* (2013.01); *H04W 52/00* (2013.01); *H04W 52/243* (2013.01); *H04W 52/267* (2013.01); *H04W 72/00* (2013.01); *H04L 5/0007* (2013.01); *Y02B 60/50* (2013.01)

(58) Field of Classification Search
USPC ........... 455/452.1, 522, 423, 452.2; 370/445, 370/232, 236, 329, 318, 246, 252; 341/22
See application file for complete search history.

(56) References Cited

U.S. PATENT DOCUMENTS

| | | | | |
|---|---|---|---|---|
| 2011/0310747 | A1* | 12/2011 | Seo ...................... | H04B 7/2606 370/246 |
| 2012/0176923 | A1* | 7/2012 | Hsu ..................... | H04W 52/243 370/252 |
| 2012/0270536 | A1* | 10/2012 | Ratasuk .............. | H04W 52/146 455/423 |
| 2013/0044697 | A1* | 2/2013 | Yoo ..................... | H04W 72/082 370/329 |
| 2013/0225194 | A1* | 8/2013 | Sung ................... | H04W 52/243 455/452.2 |
| 2013/0329594 | A1* | 12/2013 | Davydov ............. | H04B 7/0486 370/252 |
| 2014/0307696 | A1* | 10/2014 | Choi .................... | H04L 1/0038 370/329 |
| 2015/0382222 | A1* | 12/2015 | Park .......................... | H04L 1/00 370/252 |

FOREIGN PATENT DOCUMENTS

| | | |
|---|---|---|
| WO | 2010/093205 | 8/2010 |
| WO | 2012/134581 | 10/2012 |
| WO | 2012/157967 | 11/2012 |

OTHER PUBLICATIONS

PCT International Application No. PCT/KR2014/001757, Written Opinion of the International Searching Authority dated Jun. 3, 2014, 13 pages.

* cited by examiner

E-UMTS

FIG. 2
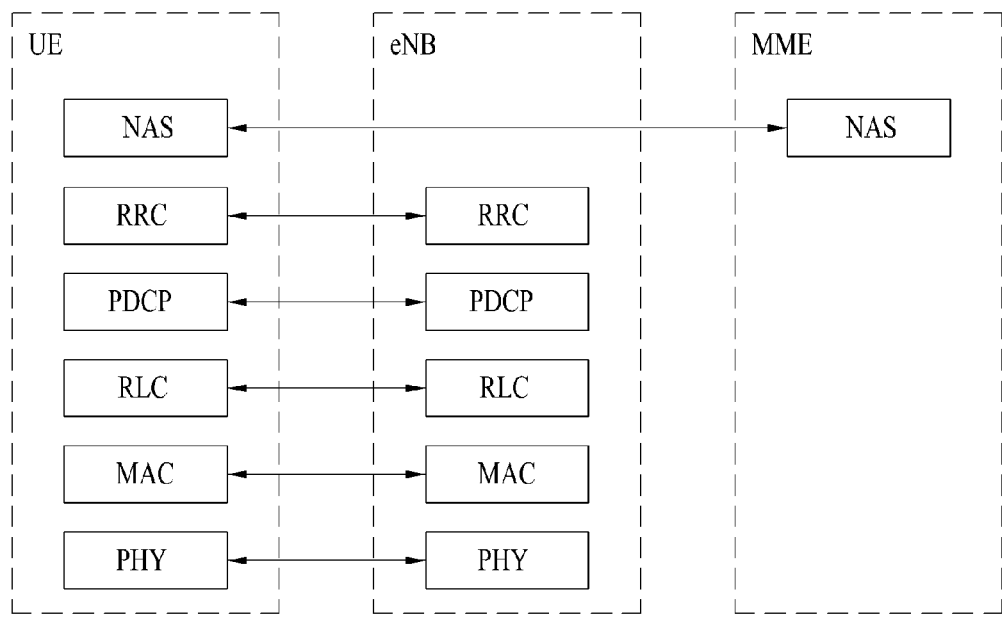
(a) Control-plane protocol stack
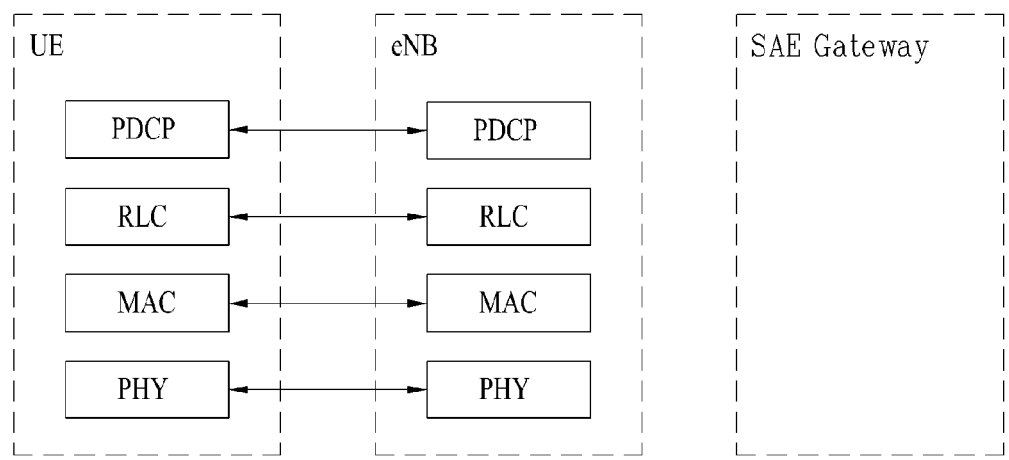
(b) User-plane protocol stack

FIG. 15
Subframe used as same usage by all eNBs
Subframe used as same usage by all eNBs
Transmission of high power or transmission at low coding rate from UE

FIG. 16

| D | S | U | U | D | D | S | U | U | D | } Frequency region in which UL/DL subframe configuration #1 is reference UL/DL subframe configuration |
| D | S | U | D | D | D | S | U | D | D | } Frequency region in which UL/DL subframe configuration #2 is reference UL/DL subframe configuration |
| D | S | U | U | U | D | S | U | U | D | } Frequency region in which UL/DL subframe configuration #6 is reference UL/DL subframe configuration |

US 9,554,391 B2

METHOD FOR MITIGATING INTERFERENCE WHEN CHANGING USE OF DYNAMIC RESOURCE IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2014/001757, filed on Mar. 4, 2014, which claims the benefit of U.S. Provisional Application Nos. 61/774,568, filed on Mar. 7, 2013, 61/808,194, filed on Apr. 3, 2013 and 61/809,873, filed on Apr. 8, 2013, the contents of which are all hereby incorporated by reference herein in their entirety.

TECHNICAL FIELD

The present invention relates to a wireless communication system and, more particularly, to an interference mitigation method during dynamic usage change of a resource in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

The present invention provides an interference mitigation method during dynamic usage change of a resource in a wireless communication system and an apparatus therefor, based on the above discussion.

Technical Solution

In accordance with an aspect of the present invention, a method for transmitting and receiving a signal to and from a user equipment by a base station in a wireless communication system includes applying one of at least one candidate resource configuration to a resource configuration for transmitting and receiving the signal; and transmitting and receiving the signal to and from the user equipment according to the applied resource configuration, wherein, if a downlink signal is transmitted to the user equipment according to the applied resource configuration on a resource designated as uplink signal reception usage from the user equipment according to a predetermined reference resource configuration, a transmit power of the downlink signal is reduced, and wherein, if an uplink signal is received from the user equipment according to the applied resource configuration on a resource designated as downlink signal transmission usage to the user equipment according to the predetermined reference resource configuration, a transmit power of the uplink signal is increased or a coding rate of the uplink signal is reduced.

In accordance with another aspect of the present invention, a base station in a wireless communication system includes a wireless communication module configured to transmit and receive a signal to and from a user equipment; and a processor configured to process the signal, wherein the processor applies one of at least one candidate resource configuration to a resource configuration for transmitting and receiving the signal and controls the wireless communication module to transmit and receive the signal to and from the user equipment according to the applied resource configuration, wherein, if a downlink signal is transmitted to the user equipment according to the applied resource configuration on a resource designated as uplink signal reception usage from the user equipment according to a predetermined reference resource configuration, the processor controls the wireless communication module to reduce a transmit power of the downlink signal, and wherein, if an uplink signal is received from the user equipment according to the applied resource configuration on a resource designated as downlink signal transmission usage to the user equipment according to the predetermined reference resource configuration, the processor controls the wireless communication module to increase a transmit power of the uplink signal or reduce a coding rate of the uplink signal.

In the above embodiments, the reference resource configuration and the at least one candidate resource configuration may define the downlink signal transmission usage and the uplink signal reception usage in units of a subframe.

The base station may be grouped together with at least one neighboring base station into one group and the reference resource configuration may be equally applied to base stations grouped into the one group.

If the base station is grouped together with at least one neighboring base station into one group, the reference resource configuration may be a resource configuration applied to a representative base station of the at least one neighboring base station. In this case, the representative base station may be changed in units of a predetermined resource. The units of a predetermined resource may be units of one or more time resources or units of one or more frequency resources.

The wireless communication system to which the present invention is applied may be a time division duplex (TDD) system and the at least one candidate resource configuration and the reference resource configuration may be subframe usage information defined in units of a radio frame.

Advantageous Effects

According to the embodiments of the present invention, intercell interference can be more efficiently mitigated during dynamic usage change of a resource in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

FIG. 15 illustrates an example of performing an interference mitigation operation according to a third embodiment of the present invention.

FIG. 16 illustrates another example of performing an interference mitigation operation according to a third embodiment of the present invention.

BEST MODE

Figure 1:
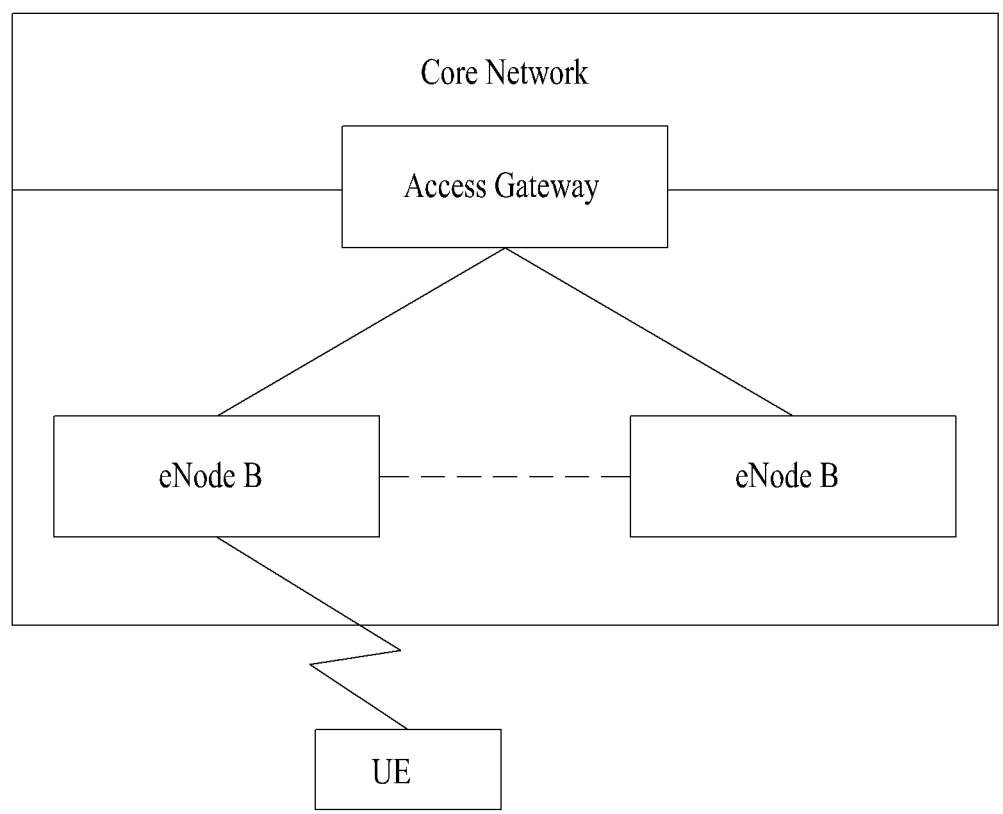
FIG. 1 is a diagram showing a network structure of an Evolved Universal Mobile Telecommunications System (E-UMTS) as an example of a wireless communication system.

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

One cell, which constructs a base station (eNB), is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
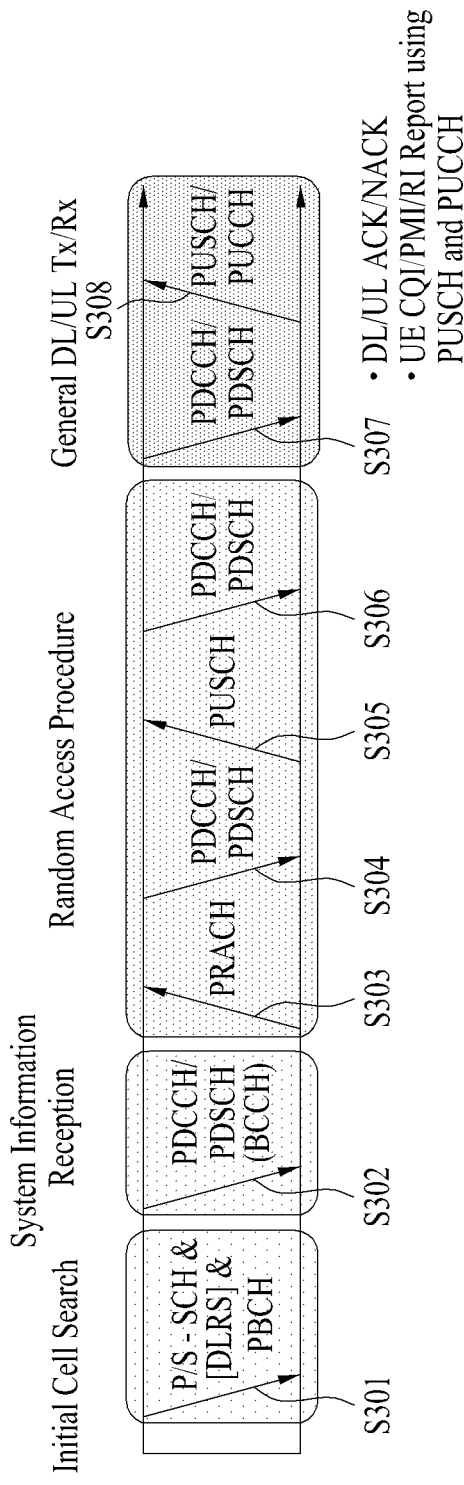
FIG. 3 is a diagram showing physical channels used in a 3GPP system and a general signal transmission method using the same.

FIG. 3 is a diagram for explaining physical channels used by 3GPP system and a general signal transmitting method using the same.

If a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303] and is then able to receive a response message via PDCCH and a corresponding PDSCH in response to the preamble [S304]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
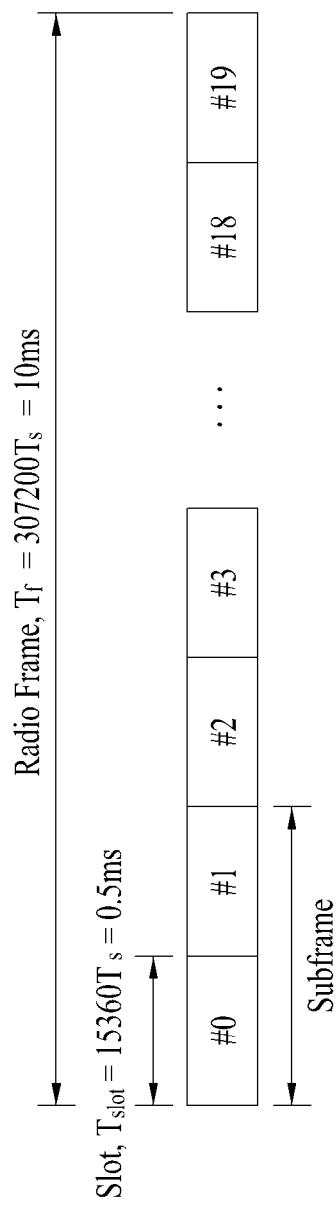
FIG. 4 is a diagram illustrating the structure of a radio frame used in a Long Term Evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360×Ts). In this case, Ts denotes a sampling time represented by Ts=1/(15 kHz× 2048)=3.2552×10-8 (about 33 ns). Each slot includes a plurality of OFDM symbols in the time domain and a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
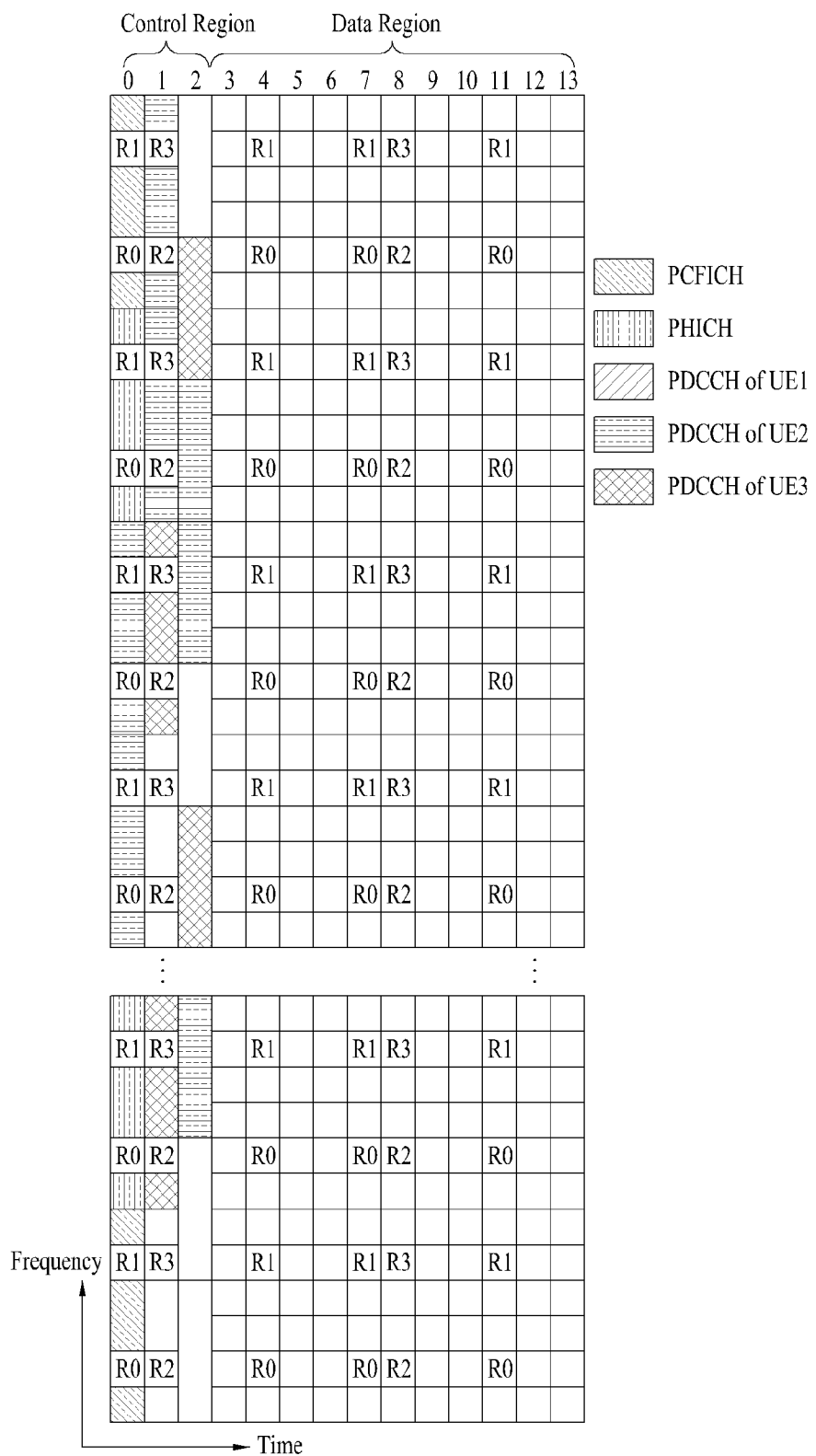
FIG. 5 is a diagram showing the structure of a downlink radio frame used in an LTE system.

FIG. 5 is a diagram for one example of a structure of a downlink (DL) subframe used by LTE system.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 sub-carrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Meanwhile, introduction of a new control channel has been demanded to apply a multiple input multiple output (MIMO) scheme and an intercell cooperative communication scheme. A newly discussed control channel due to this necessity is an enhanced PDCCH (EPDCCH) and this channel has been determined to be allocated to a data region (hereinafter, a PDSCH region) rather than an existing control region (hereinafter, a PDCCH region). Consequently, using the EPDCCH enables transmission of control information for a node to each UE and can also solve shortage of the existing PDCCH region. For reference, the EPDCCH is not provided to a legacy UE. Instead, only an LTE-A UE can receive the EPDCCH. The EPDCCH is transmitted and received based not on an existing cell specific reference signal (CRS) but on a demodulation reference signal (DM-RS) (or channel state information reference signal (CSI-RS)).

Figure 6:
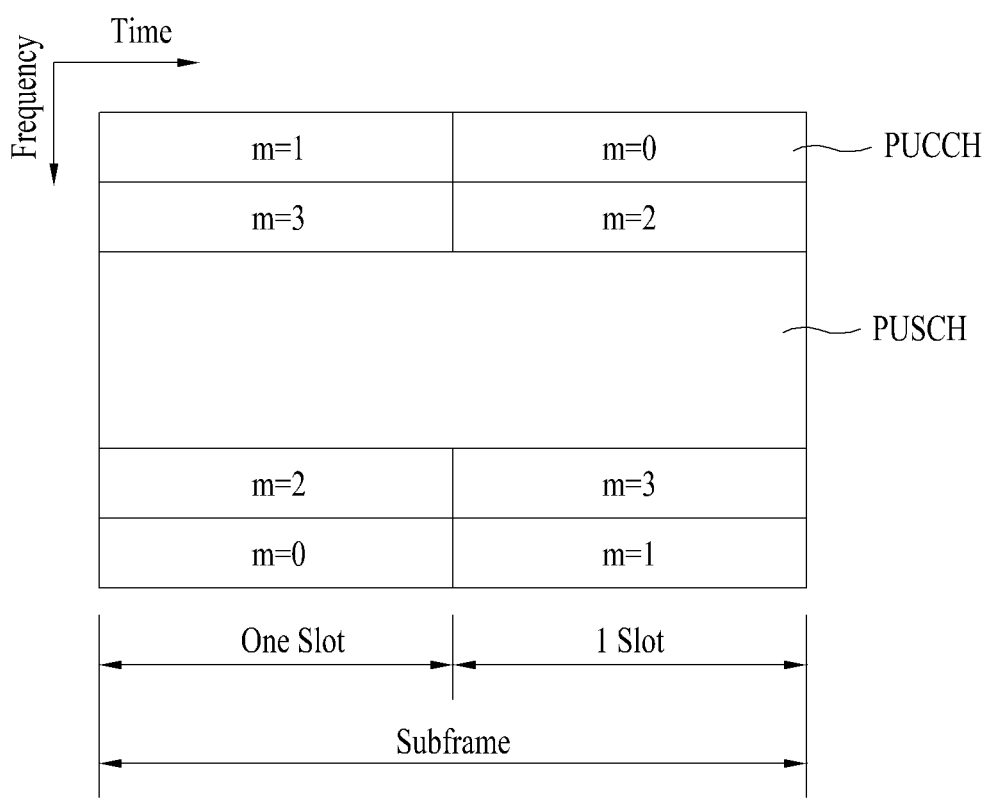
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

Figure 7:
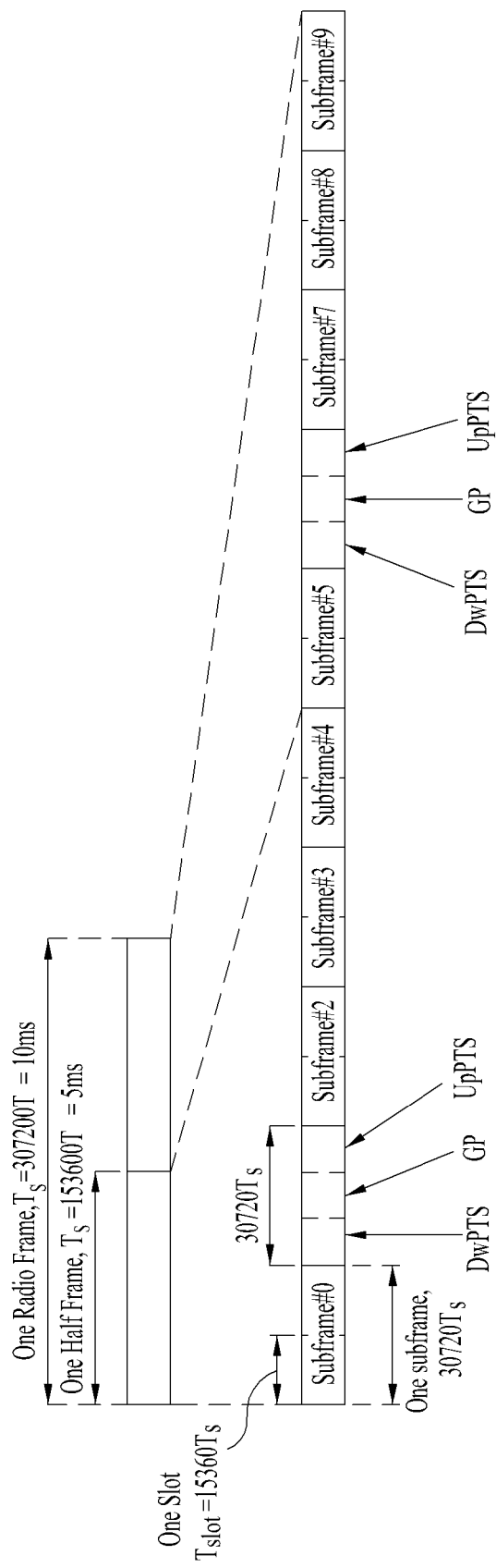
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Currently, the special subframe in the LTE TDD system includes a total of 10 configurations defined as shown in Table 1.

TABLE 1

| | | Normal cyclic prefix in downlink | | | Extended cyclic prefix in downlink | | |
| | | | UpPTS | | | UpPTS | |
| | | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 1-continued

| | | Normal cyclic prefix in downlink | | | | |
|---|---|---|---|---|---|---|
| | | UpPTS | | | Extended cyclic prefix in downlink | |
| | | Normal | Extended | | UpPTS | |
| Special subframe configuration | DwPTS | cyclic prefix in uplink | cyclic prefix in uplink | DwPTS | Normal cyclic prefix in uplink | Extended cyclic prefix in uplink |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, in the LTE TDD system, a UL/DL configuration is shown in Table 3 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D, U, and S refer to a downlink subframe, an uplink subframe, and the special subframe. In addition, Table 2 also shows downlink-to-uplink switch-point periodicity in an uplink/downlink subframe configuration in each system.

Hereinafter, a carrier aggregation scheme will be described.

Figure 8:
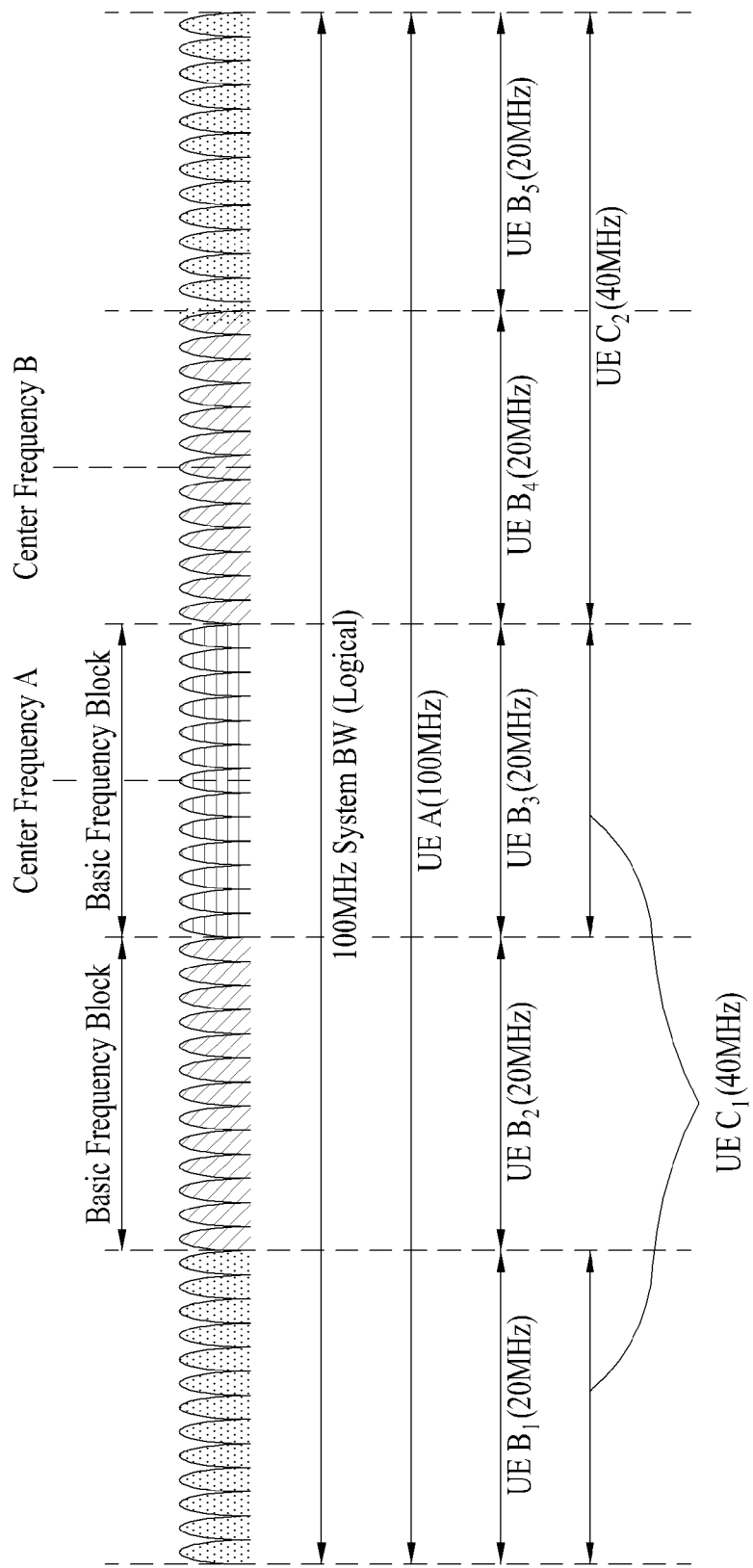
FIG. 8 is a diagram for a concept to describe a carrier aggregation scheme.

FIG. 8 is a diagram for a concept to describe a carrier aggregation scheme.

Carrier aggregation means a method for a user equipment to use one wide logical frequency band using a plurality of frequency blocks or cells (in the logical meaning) configured with uplink resources (or component carriers) and/or downlink resources (or component carriers) in order for a wireless communication system to use a wider frequency band. For clarity of the following description, such a terminology as a component carrier shall be uniformly used.

Referring to FIG. 8, a full system bandwidth (BW) is a logical band and has maximum 100 MHz of bandwidth. The full system bandwidth includes 5 component carriers. And, each of the component carriers has maximum 20 MHz of bandwidth. The component carrier includes at least one contiguous subcarrier that is physically contiguous. Although FIG. 8 shows that each of the component carriers has the same bandwidth for example, each of the component carriers can have a different bandwidth. In the drawing, the component carriers are adjacent to each other in frequency domain. Yet, the drawing is attributed to the logical concept. Hence, the component carriers may be physically adjacent to each other or may be spaced apart from each other.

A different center frequency may be used for each component carrier. Alternatively, one common center frequency may be used for component carriers physically adjacent to each other. For instance, in FIG. 8, assuming that all component carriers are physically adjacent to each other, it is able to use a center frequency A. Assuming that component carriers are not physically adjacent to each other, it is able to separately use a center frequency A, a center frequency B or the like for each component carrier.

In the present specification, a component carrier may correspond to a system bandwidth of a legacy system. If a component carrier is defined with reference to a legacy system, backward compatibility offering and system design can be facilitated in a wireless communication environment in which an advanced user equipment and a legacy user equipment coexist. For example, if the LTE-A system supports carrier aggregation, each component carrier may correspond to a system band of the LTE system. In this case, a component carrier may have one of bandwidths of 1.25, 2.5, 5, 10, and 20 MHz.

In case that a full system bandwidth is extended by carrier aggregation, a frequency band used for a communication with each user equipment (UE) is defined by component carrier unit. UE A can use a full system band 100 MHz and performs a communication using all of 5 component carriers. Each of UE B1 to UE B5 can use 20 MHz bandwidth only and perform a communication using one component carrier. Each of UE C1 and UE C2 can use 40 MHz bandwidth and perform a communication two component carriers. In this case, the two component carriers may be logically/physically adjacent to each other or may not. The UE C1 shows a case of using two component carriers no adjacent to each other. And, the UE C2 shows a case of using two component carriers adjacent to each other.

In case of LTE system, one DL component carrier and one UL component carrier are used. On the other hand, in case of LTE-A system, several component carriers are usable as shown in FIG. 8.

In doing so, schemes for a control channel to schedule a data channel can be categorized into a linked carrier scheduling scheme of the related art and a cross carrier scheduling scheme.

More specifically, in the linked carrier scheduling scheme, a control channel transmitted on a specific component carrier (CC) as in a legacy LTE system using a single CC schedules only a data channel on the specific CC. That is, a DL grant/UL grant transmitted in a PDCCH region of a DL CC of the specific CC (or specific cell) can schedule only a PDSCH/PUSCH of a cell to which the DL CC belongs. In other words, a search space, which is a region in which detection of the DL grant/UL grant is attempted, is present in a PDCCH region of a cell in which a scheduled PDSCH/PUSCH is located.

Meanwhile, in the cross carrier scheduling scheme, a control channel transmitted on a primary CC using a carrier indicator field (CIF) schedules a data channel transmitted on the primary CC or on another CC. In other words, a monitored cell (or monitored CC) of cross carrier scheduling is configured and a DL grant/UL grant transmitted in a PDCCH region of the monitored cell schedules a PDSCH/PUSCH of a cell configured to be scheduled in the monitored cell. Namely a search space for a plurality of CCs is present in a PDCCH region of the monitored cell. The primary cell among the plurality of cells is configured to transmit system information, attempt to perform initial access, or transmit UL control information. The primary cell is composed of a DL primary CC and a UL primary CC corresponding to the DL primary CC.

Figure 9:
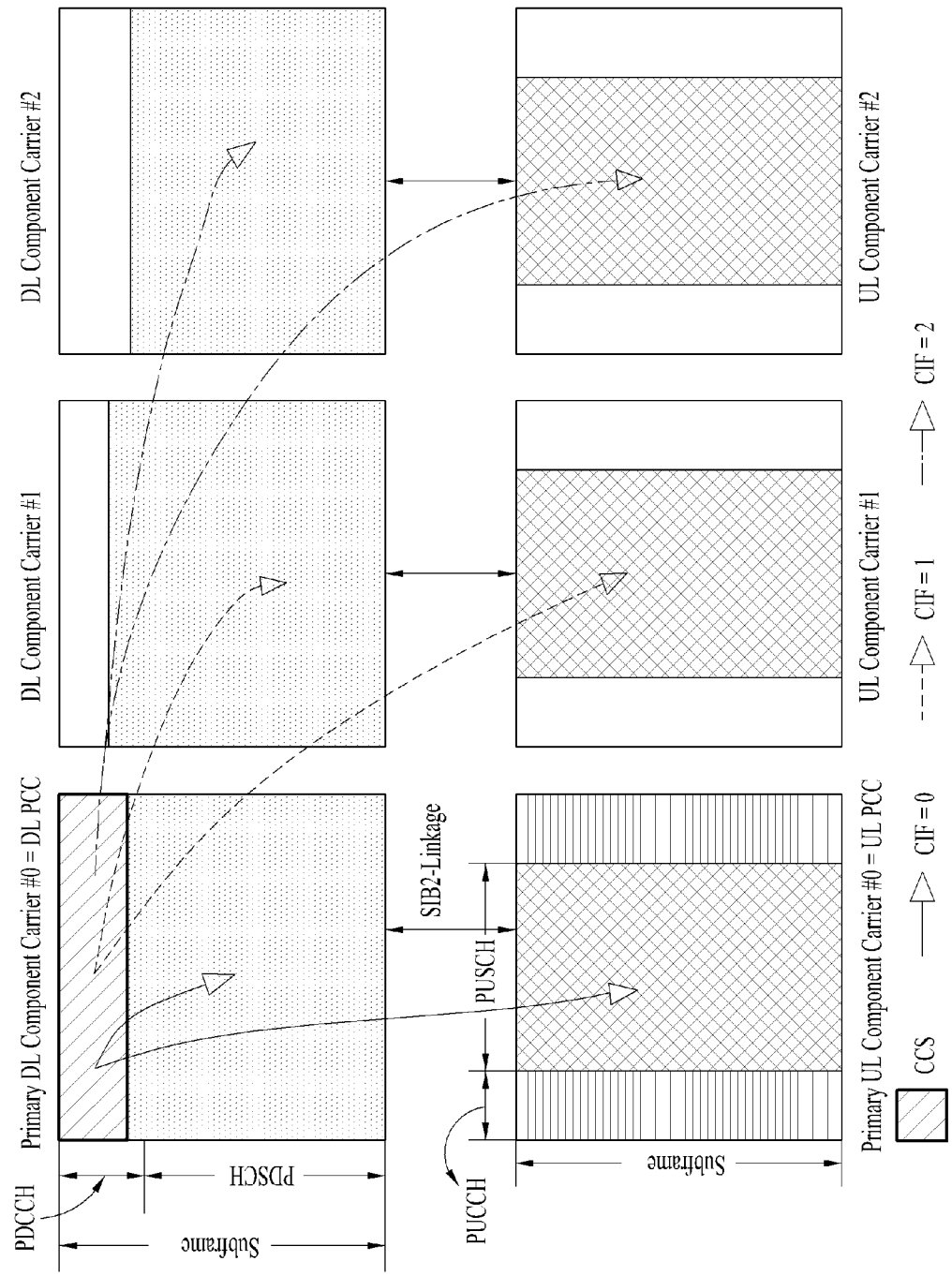
FIG. 9 is a diagram illustrating an example of applying a cross carrier scheduling scheme.

FIG. 9 is a diagram illustrating an example of applying a cross carrier scheduling scheme. Particularly, in FIG. 9, three cells (or CCs) are allocated and the cross carrier scheduling scheme using the CIF as described above is performed. It is assumed that DL cell #A is a DL primary CC (i.e. primary cell (PCell)) and the other CCs #B and #C are secondary CCs (i.e. secondary cells (SCells)).

The present invention proposes a scheme capable of mitigating intercell interference in a network in which an operation of dynamically changing DL resources and UL resources is performed.

The DL resources and the UL resources represent resources used by an eNB to transmit a signal to a UE and resources used by the UE to transmit a signal to the eNB, respectively. Specifically, in an FDD system, resources in the frequency domain are divided into the DL resources and the UL resources to define DL carriers and UL carriers and, in a TDD system, resources in the time domain are divided into the DL resource and the UL resource to define DL subframes and UL subframes in one carrier.

In addition, the operation of dynamically changing the DL resources and the UL resources refers to an operation of dynamically changing division of total time resources and/or total frequency resources by a specific cell into the DL resources and the UL resources according to the amount of DL traffic and UL traffic at a specific time. An eNB may signal, to a UE, how to divide total time resources and/or total frequency resources during a predetermined time into the DL resources and the UL resources and this may be interpreted as designation of a resource usage configuration. In the FDD system, the eNB may designate the resource usage configuration by defining a configuration in which a partial time/frequency region of DL carriers is used for signal transmission of the UE or a partial time/frequency region of UL carriers is used for signal transmission of the eNB as a result of dynamic usage configuration. In the TDD system, the UL/DL subframe configurations of Table 2, used at every timing, may differ due to a dynamically changeable resource usage configuration.

Figure 10:
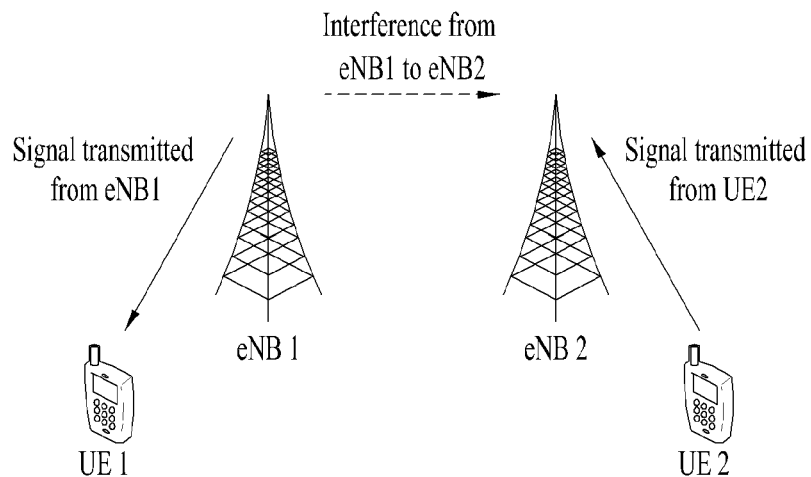
FIG. 10 is a diagram illustrating problems when two cells use different UL/DL subframe configurations.

Meanwhile, when two neighboring eNBs use different UL/DL subframe configurations, a serious interference problem may arise. FIG. 10 is a diagram illustrating problems when two cells use different UL/DL subframe configurations.

Referring to FIG. 10, when eNB1 performs DL transmission using a specific time/frequency resource, if neighboring eNB2 receives a UL signal of a UE in the specific resource, the transmission signal of eNB1 functions as strong interference in the UL signal of eNB2 and the probability that eNB2 successfully receives the signal becomes very low.

One method for solving this situation is to form nearby eNBs into one so that eNBs in the same group use the same UL/DL subframe configuration. For example, eNBs having path loss of a predetermined level or more between two eNBs may be formed as one group. eNBs in the same group may exchange traffic states thereof, for example, buffer information for DL traffic and UL traffic and determine a UL/DL subframe configuration to be used by all of the eNBs in the group in consideration of the state of the group. It is apparent that eNBs that are grouped are not limited and one or more cells in units of an individual cell may be grouped or transmission/reception points composed of antennas without additional cell IDs may be grouped. Hereinbelow, it is assumed that eNBs become units of a group and an intercell interference operation is performed between the eNBs.

The eNB grouping method is very effective when quality of a backhaul link connecting the eNBs is good but has difficulty in performing a proper operation when quality of the backhaul link is not good. As an example, assuming that a time delay consumed when an eNB transmits specific information to another eNB via the backhaul link is D seconds, it takes D seconds to collect the traffic state of each eNB in a group and it takes D seconds to transmit a UL/DL subframe configuration to be used by the eNB in the group based on the collected traffic state. Therefore, a new UL/DL subframe configuration can be used after 2*D seconds. If the value of D is large, a considerable time delay occurs in determining the new UL/DL subframe configuration and thus an original purpose of dynamically determining a UL/DL subframe configuration according to a real-time traffic state is not achieved.

Therefore, an interference adjustment scheme capable of dynamically changing the UL/DL subframe configuration without an intercell interference problem even when there is a long delay due to poor quality of the backhaul link is needed. Hereinbelow, embodiments of the interference adjustment scheme will be described.

<First Embodiment>

In the first embodiment of the present invention, a scheme in which an eNB designates a UL/DL subframe configuration thereof based on a reference UL/DL subframe configuration is described.

According to the first embodiment, eNBs select one UL/DL subframe configuration in consideration of a traffic state in a group as in the above-described eNB grouping scheme. However, the selected UL/DL subframe configuration is merely a UL/DL subframe configuration which becomes a reference when each eNB in a group finally selects a UL/DL subframe configuration thereof and performs an operation according to the selected UL/DL subframe configuration and each eNB may use a different UL/DL subframe configuration according to a situation thereof. Hereinafter, one UL/DL subframe configuration which becomes a reference in a group will be referred to as a reference UL/DL subframe configuration.

If each eNB conforms to the reference UL/DL subframe configuration, the eNB uses a UL/DL subframe configuration different from that of a neighboring cell and thus may not have to consider an interference mitigation scheme. That is, if a resource configured as DL in the reference UL/DL subframe configuration is used as DL, an interference mitigation operation considering interference caused by signal reception of a neighboring eNB in a group is omitted and a DL operation is performed without any restriction. In addition, if a resource configured as UL in the reference UL/DL subframe configuration is used as UL, an operation of handling interference caused by a signal transmitted by a neighboring eNB in a group is omitted and a UL operation is performed without any restriction. This may indicate that each eNB may assume that other eNBs in the group operate according to the reference UL/DL subframe configuration.

On the other hand, if each eNB does not conform to the reference UL/DL subframe configuration, the eNB may perform an operation different from that of a neighboring cell and thus the eNB may be regulated to perform an interference mitigation scheme. That is, if a resource configured as UL in the reference UL/DL subframe configuration is used as DL, an interference mitigation operation considering interference caused by signal reception of a neighboring eNB in a group should be performed. For example, an eNB may reduce a DL transmit power thereof so that interference which is expected to affect a reception signal of a neighboring eNB may be less than a predetermined level. Obviously, an operation for preventing all interference by setting the DL transmit power to 0 may be performed.

If a resource configured as DL in the reference UL/DL subframe configuration is used as UL, each eNB performs a UL operation while handling interference caused by a signal transmitted by a neighboring eNB in a group. As an example, the eNB performs an operation for receiving a UL signal thereof on the assumption that the neighboring eNB transmits a DL signal at a maximum power. To this end, the eNB may command a UE to raise a transmit power of UL data or may configure UL data which is robust against interference by increasing a coding rate of the UL data. Obviously, although such an interference mitigation operation may be unnecessary because the neighboring eNB uses a configuration different from the reference UL/DL subframe configuration at the same timing, it is assumed that this situation is not shared among eNBs because of a poor backhaul link.

In performing the above-described operations, UL/DL subframe configurations which are selectable by each eNB may be limited. This is to prepare for minimum resources on which an interference mitigation operation is unnecessary according to a traffic situation because it is impossible to completely eliminate a negative effect of the interference mitigation operation even though an eNB performs the interference mitigation operation upon selecting a UL/DL subframe configuration different from the reference UL/DL subframe configuration.

For example, in a process of determining the reference UL/DL subframe configuration and sharing the configuration among eNBs in a group, a set of UL/DL subframe configurations which are selectable by each eNB may be additionally shared. Each eNB selects an optimal UL/DL subframe configuration in a given set of UL/DL subframe configurations while configuring the interference mitigation operation with another eNB centering around the reference UL/DL subframe configuration.

If an eNB uses a UL/DL subframe configuration different from the reference UL/DL subframe configuration, partial performance degradation may occur in a DL or UL operation due to the interference mitigation operation. Therefore, each eNB desirably selects an optimal UL/DL subframe configuration by comparing gain obtained by using a UL/DL subframe configuration different from the reference UL/DL subframe configuration with partial performance degradation. For example, even in a situation in which it is favorable to allocate more resources than resources in the reference UL/DL subframe configuration to DL traffic because there is no current UL traffic, if a UL resource in the reference UL/DL subframe configuration is used as a DL resource, DL performance may be partially degraded due to the interference mitigation operation such as transmit power reduction. Accordingly, if DL traffic is lower than a predetermined level, the eNB may perform an operation according to the reference UL/DL subframe configuration.

Figure 11:
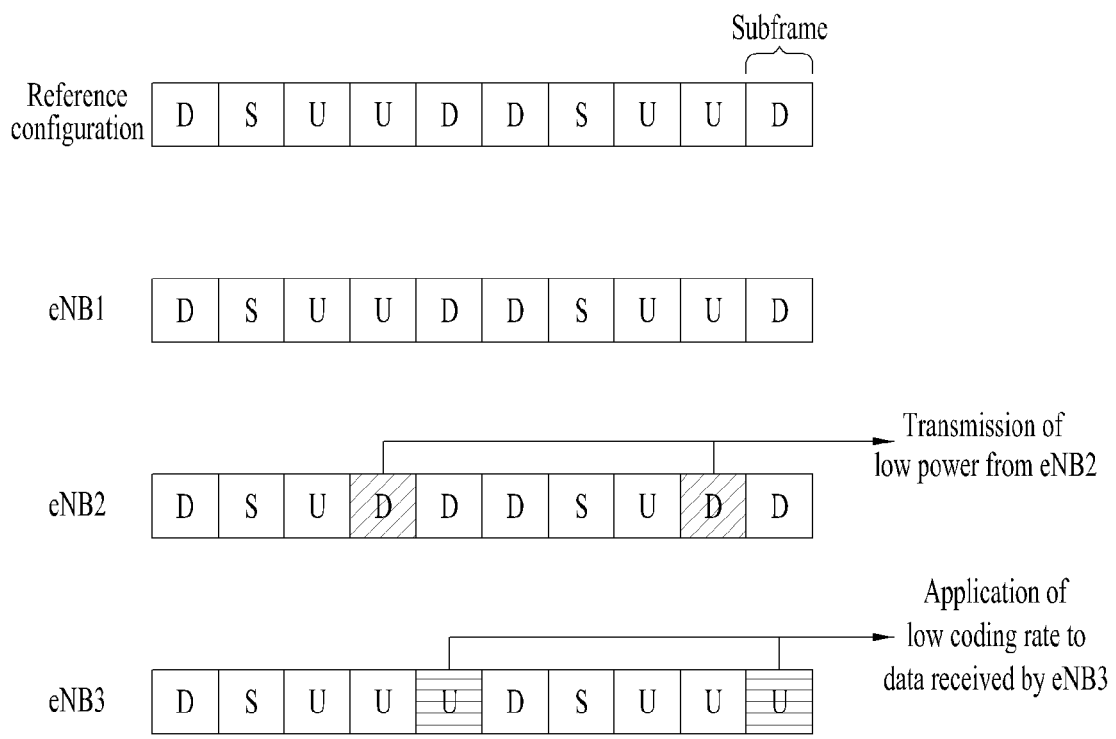
FIG. 11 illustrates an example of performing an interference mitigation operation according to a first embodiment of the present invention.

FIG. 11 illustrates an example of performing an interference mitigation operation according to a first embodiment of the present invention. Particularly, it is assumed in FIG. 11 that eNB1, eNB2, and eNB3 are grouped into one group, UL/DL subframe configuration #1 is designated as a reference UL/DL subframe configuration, and UL/DL subframe configurations #0, #1, and #2 are given as a set of selectable UL/DL subframe configurations.

Referring to FIG. 11, since eNB1 operates according to the reference UL/DL subframe configuration, an additional interference mitigation scheme is not needed. However, eNB2 including much DL traffic selects UL/DL subframe configuration #2 as a configuration for an actual operation. As a result, upon performing DL transmission in subframe #3 and subframe #8 configured as UL in the reference UL/DL subframe configuration, eNB2 reduces a transmit power in order to reduce interference with respect to a neighboring eNB. In addition, eNB3 including much UL traffic selects UL/DL subframe configuration #0 as a configuration for an actual operation. As a result, upon performing UL reception in subframe #4 and subframe #9 which are configured as DL in the reference UL/DL subframe configuration, eNB3 performs an operation of reducing a coding rate in order to overcome interference generated from a neighboring eNB.

Namely, in FIG. 11, it is determined whether a reference configuration is equal to a configuration selected for an actual operation in units of a subframe.

An operation of transmitting the reference UL/DL subframe configuration and a set of UL/DL subframe configurations which are selectable by each eNB may be implemented such that a communication direction is designated per subframe and whether to conform to the communication direction is designated.

As an example, as illustrated in FIG. 11, in a situation in which UL/DL subframe configuration #1 is given as the reference UL/DL subframe configuration, it is assumed in all of UL/DL subframe configurations #0, #1, and #2 which are selectable by the eNB that subframes #0, #1, #2, #5, #6, and #7 are designated as a DL subframe, a special subframe, a UL subframe, a DL subframe, a special subframe, and a UL subframe, respectively. In this case, information about subframes in which all eNBs should conform to usage designated in the reference UL/DL subframe configuration as in subframes #0, #1, #2, #5, #6, and #7 or information about subframes in which all eNBs need not conform to usage designated in the reference UL/DL subframe configuration may be transmitted in addition to information about the reference UL/DL subframe configuration. The other subframes #3, #4, #7, and #8 may permit each eNB to use the subframes as usage different from usage designated in the reference UL/DL subframe configuration according to a circumstance of the eNB.

If the subframes are used for usage different from usage designated in the reference UL/DL subframe configuration, an operation capable of solving interference affecting an eNB using the reference UL/DL subframe configuration or interference caused by an eNB using the reference UL/DL subframe configuration should be performed. That is, in a subframe permitted to be used for usage different from usage designated in the reference UL/DL subframe configuration, subframe usage designated in the reference UL/DL subframe configuration may be used for subframe usage having priority in the corresponding subframe.

Namely, in specifically designated subframes (subframes #0, #1, #2, #5, #6, and #7 in FIG. 11), subframe usage designated in the reference UL/DL subframe configuration should be maintained. In contrast, in the other subframes (subframes #3, #4, #8, and #9 in FIG. 11), subframe usage designated in the reference UL/DL subframe configuration may be interpreted as subframe usage having priority, that is, recommended to conform to subframe usage designated in the reference UL/DL subframe configuration. In this case, if the locations of subframes conforming to usage designated in the reference UL/DL subframe configuration are determined, this has an effect of automatically determining a set of UL/DL subframe configurations which are selectable by the eNB. Especially, specific subframes are selected not to conform to the reference UL/DL subframe configuration so that each eNB may be permitted to arbitrarily determine a subframe configuration.

To perform the above-described operation of selecting the reference UL/DL subframe configuration and a set of UL/DL subframe configurations which are selectable by each eNB, eNBs in a group need to monitor traffic states thereof. To this end, each eNB may transmit signals indicating a DL buffer state thereof and a UL buffer state thereof to neighboring eNBs. Alternatively, each eNB may inform the neighboring eNBs of a UL/DL subframe configuration which is most suitable for the traffic state thereof.

Particularly, since the amount of traffic which can be processed in one subframe differs according to the situation of an eNB, indication of the UL/DL subframe configuration suitable for the traffic state has an advantage of indicating an optimal UL/DL subframe configuration selected in consideration of both the buffer state and traffic processing yield. Additionally, one eNB may signal two or more UL/DL subframe configurations suitable for a state thereof. As an example, in terms of a specific eNB in which UL traffic is absent and DL traffic is present, since it is favorable to allocate as many DL resources as possible, the eNB may select UL/DL subframe configuration #5 in Table 2 as an optimal UL/DL subframe configuration.

However, if there is not much DL traffic of the eNB, the eNB may process the traffic without any difficulty only if the number of DL subframes is above a predetermined level. In this case, if another neighboring eNB requires many UL subframes, there is no need to select only a UL/DL subframe configuration having quite a number of DL subframes relative to UL subframes, such as UL/DL subframe configuration #5. In this case, the eNB may inform neighboring eNBs of a set of UL/DL subframe configurations in which the eNB can process traffic thereof at a predetermined level or more. For example, on the assumption that a special subframe is regarded as a DL subframe, the eNB may select UL/DL subframe configurations #2, #3, #4, and #5 having 7 or more DL subframes as UL/DL subframe configurations suitable for the state of the eNB.

Additionally, if the eNB indicates a plurality of UL/DL subframe configurations, priority may be determined to signal which one of the multiple UL/DL subframe configurations is more suitable for the eNB. Obviously, if 9 DL subframes are needed due to much DL traffic for the eNB, only UL/DL subframe configuration #5 may be signaled as a UL/DL subframe configuration suitable for the eNB.

The above operation of selecting a reference UL/DL subframe configuration and a set of UL/DL subframe configurations which are selectable by each eNB may be performed by a specific eNB as a representative of a corresponding group. The other eNBs in the group may inform the representative eNB of information about traffic states thereof and receive a reference UL/DL subframe configuration and a set of UL/DL subframe configurations which are selectable by each eNB. Additionally, each eNB may feed back information as to whether the reference UL/DL subframe configuration is suitable or the set of selectable UL/DL subframe configurations is suitable to the representative eNB.

As an example, each eNB may feed back a percentage of resources configured thereby according to the reference UL/DL subframe configuration among total resources or feed back a frequency of actually selecting a UL/DL subframe configuration from a set of selectable UL/DL subframe configurations, for example, a probability of selecting each UL/DL subframe configuration.

<Second Embodiment>

In the second embodiment of the present invention, a scheme in which usage of some resource is identically configured in a group and priority is given to a specific eNB in the other resources will be described.

In this scheme, an entire region is split into two regions and all eNBs in a group perform the same operation in one region. In the case of a TDD system for example, all eNBs in a group perform a DL or UL operation in some designated subframes among all subframes. A region in which all eNBs perform the same operation may be called a group common resource region.

Although each eNB may independently select a DL and UL operation according to a traffic situation thereof on resources (this is referred to as cell specific resources) other than resources in the group common resource region, priority is given to a specific eNB to use each resource in order to solve an interference problem which may arise when all eNBs independently select the DL or UL operation with the same priority. Similarly, in the case of TDD for example, a specific eNB is authorized to have priority to use each subframe belonging to cell specific subframes.

An eNB to which priority is given on a specific resource may omit an intercell mitigation operation upon using the resource. That is, if the resource is used for DL, a DL transmit power may not be adjusted and, if the resource is used for UL, an operation such as UL transmit power adjustment or coding rate adjustment for preparing for interference from other eNBs in a group may be omitted. On the other hand, an eNB to which priority is not given may be determined to necessarily perform an intercell mitigation operation upon using the corresponding resource. For example, if the resource is used for DL, a DL transmit power may be adjusted such that interference with respect to an eNB to which priority is given is less than a predetermined level. If the resource is used for UL, since there may be interference from an eNB to which priority is given, an operation of raising a UL transmit power or lowering a coding rate may be performed to mitigate interference. It is apparent that an operation of omitting UL transmission can be performed. In this case, this operation may be interpreted as not using the corresponding resource for UL transmission in order to avoid interference from other eNBs.

Figure 12:
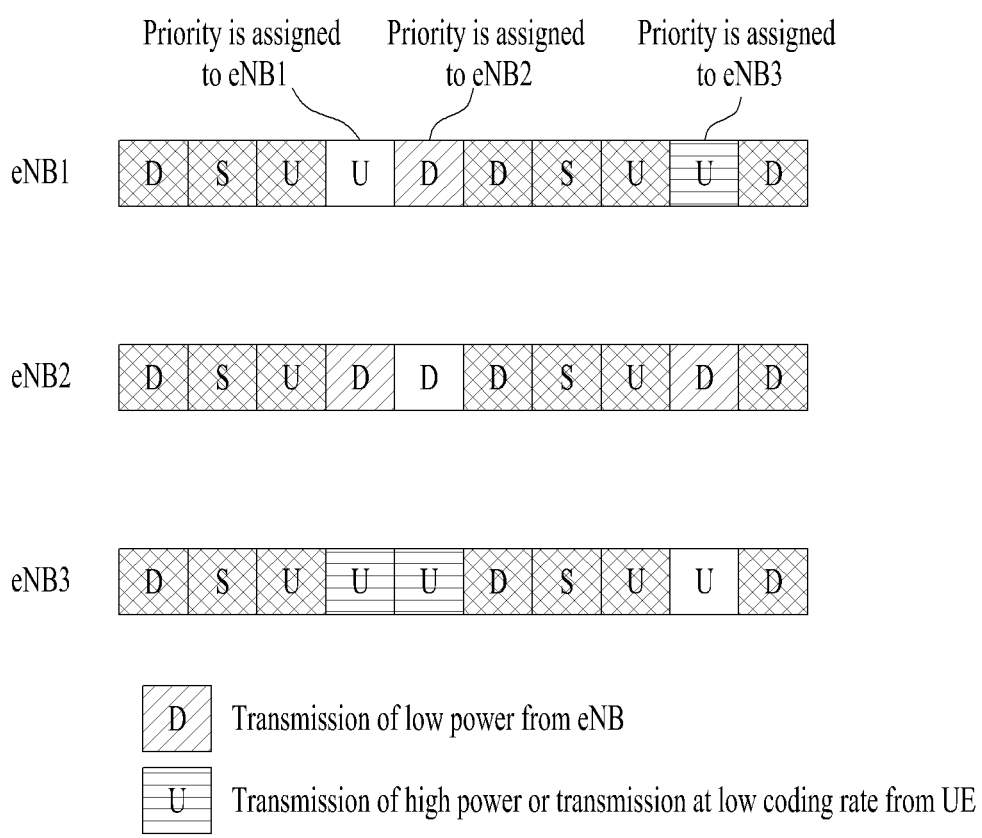
FIG. 12 illustrates an example of performing an interference mitigation operation according to a second embodiment of the present invention.

FIG. 12 illustrates an example of performing an interference mitigation operation according to a second embodiment of the present invention. Particularly, it is assumed in FIG. 12 that eNB1, eNB2, and eNB3 belonging to one group include subframes #0, #1, #2, #5, #6, #7, and #9 as group common subframes and subframes #0, #1, #2, #5, #6, #7, and #9 are configured as a DL subframe, a special subframe, a UL subframe, a DL subframe, a special subframe, a UL subframe, and a DL subframe, respectively. In addition, it is assumed that eNB1, eNB2, and eNB3 are respectively prioritized in subframes #3, #4, and #8, which are cell specific subframes, and the three eNBs select UL/DL subframe configurations #1, #2, and #6 as optimal UL/DL subframe configurations.

Referring to FIG. 12, eNB1 having priority in subframe #3 performs a desired operation without an additional interference mitigation operation, whereas eNB2 using subframe #3 as a DL subframe without priority performs an operation of reducing a DL transmit power in order to reduce interference which may affect eNB1 when eNB1 having priority in subframe #3 performs a UL reception operation. Similarly, eNB3 performs an operation of increasing a UL transmit power or lowering a coding rate in order to prepare for interference which may be generated when eNB1 having priority in subframe #3 performs a DL transmission operation. In this embodiment, although eNB1 performs a UL operation in subframe #3, since eNB3 does not know this fact, eNB3 performs an operation on the assumption that eNB1 having priority in subframe #3 may perform a DL operation in subframe #3 in which priority is not given to eNB3.

If priority is continuously given to a specific eNB, a fairness problem may occur between cells because the specific eNB is always favorable in processing traffic. Therefore, a time order of priority assigned to each eNB in a group favorably varies with time and an order to which priority is assigned may be predesignated. For example, although priority is given in order of eNB1→eNB2→eNB3 in the first radio frame of FIG. 12, an operation of shifting this order in order of eNB2→eNB3→eNB1 in the second radio frame and in order of eNB3→eNB1→eNB2 in the third radio frame may be repeated.

Additionally, an eNB having priority may inform other eNBs whether to perform DL transmission or UL reception in a corresponding resource. Using this information, an unnecessary interference mitigation operation of eNBs having no priority can be prevented. As an example, although eNB3 has taken a proper action in subframe #3 in FIG. 12 in order to prepare for the probability that eNB1 performs DL transmission at a high power, if eNB3 knows that eNB1 performs a UL operation in subframe #3, eNB3 may omit such an action. Similarly, although eNB1 has performed an operation of reducing a DL transmit power in subframe #4 on the assumption that eNB2 having priority in subframe #4 performs a UL operation in subframe #4, if eNB1 knows that eNB2 performs a DL operation in subframe #4, eNB1 may omit this operation.

As a method for indicating an eNB having priority in a cell specific resource and an operation of the eNB, a UL/DL subframe configuration used by each eNB in a group may be indicated together with an ID of an eNB having priority in each resource. In FIG. 12 for example, in addition to information about a group common subframe configuration, information indicating that eNB1, eNB2, and eNB3 are respectively prioritized in subframes #3, #4, and #9 and UL/DL subframe configurations used by eNB1, eNB2, and eNB3 may be indicated. Especially, a UL/DL subframe configuration used by a specific eNB may be interpreted as the reference UL/DL subframe configuration described in the first embodiment on a resource on which the specific eNB has priority. From this viewpoint, one group operates by applying an additional reference UL/DL subframe configuration per resource.

Meanwhile, although a time region in which a specific eNB has priority may be an individual subframe, the time region may be a region composed of a plurality of subframes, a specific radio frame, or a set of radio frames. This will now be described with reference to FIG. 13.

Figure 13:
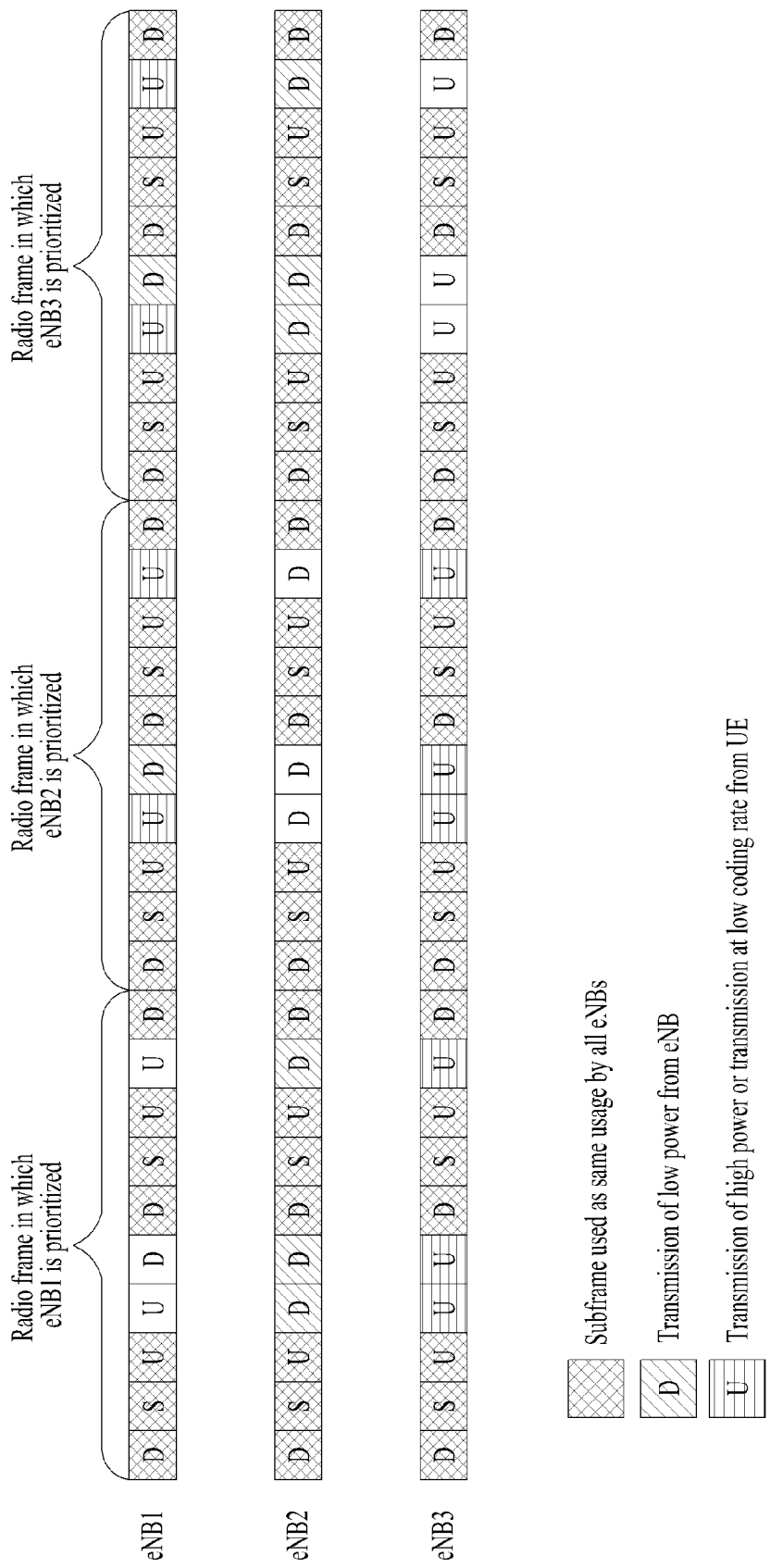
FIG. 13 illustrates another example of performing an interference mitigation operation according to a second embodiment of the present invention.

FIG. 13 illustrates another example of performing an interference mitigation operation according to a second embodiment of the present invention. Particularly, in FIG. 13, priority is given to a specific eNB per radio frame. eNB1, eNB2, and eNB3 are prioritized in three radio frames and it is assumed that eNB1, eNB2, and eNB3 select UL/DL subframe configurations #1, #2, and #6 as optimal UL/DL subframe configurations.

Referring to FIG. 13, in the first radio frame, eNB1 with priority uses subframes #3, #4, and #8 as a UL subframe, a DL subframe, and a UL subframe, respectively and does not apply an intercell mitigation scheme. On the other hand, eNB2 uses subframes #3, #4, and #8 as DL subframes and adjusts a DL transmit power in order to reduce interference which affects eNB1. eNB3 uses subframes #3, #4, and #8 as UL subframes and performs an operation for overcoming interference from eNB1.

In the second radio frame, eNB2 has priority and uses all of subframes #3, #4, and #8 as DL subframes. In the third radio frames, eNB3 has priority and uses all of subframes #3, #4, and #8 as UL subframes.

Thus, when an eNB with priority differs in units of a radio frame, it may be interpreted that the reference UL/DL subframe configuration described in the first embodiment varies with time.

Figure 14:
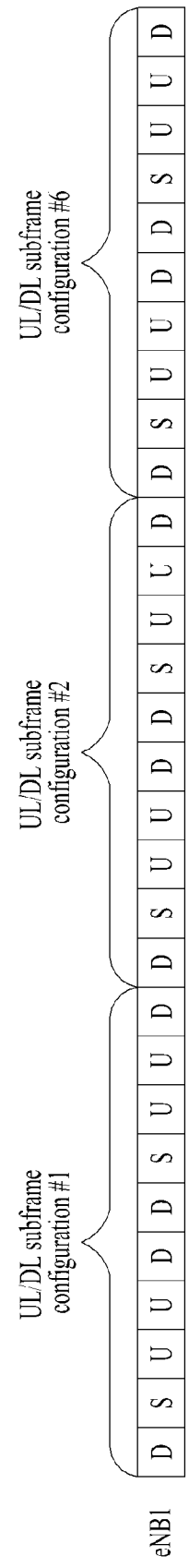
FIG. 14 illustrates another example of performing an interference mitigation operation according to a second embodiment of the present invention.

FIG. 14 illustrates another example of performing an interference mitigation operation according to a second embodiment of the present invention. Particularly, FIG. 14 illustrates another example of FIG. 13 in terms of the reference UL/DL subframe configuration.

Referring to FIG. 14, a reference UL/DL subframe configuration varies in order of UL/DL subframe configurations #1, #2, and #6 selected by eNB1, eNB2, and eNB3 having priority in three radio frames. If a representative eNB is present in one eNB group and the representative eNB determines the reference UL/DL subframe configuration, the representative eNB may inform the other eNBs in the group of information about at which time which UL/DL subframe configuration becomes the reference UL/DL subframe configuration. As an example, the representative eNB may indicate the reference UL/DL subframe configuration in each radio frame. Alternatively, the representative eNB may indicate a specific UL/DL subframe configuration, determine time length during which the UL/DL subframe configuration becomes the reference UL/DL subframe configuration, and transmit information in the form of designating a UL/DL subframe configuration corresponding to the reference UL/DL subframe configuration and a duration of the UL/DL subframe configuration.

Alternatively, an order of UL/DL subframe configurations used as the reference UL/DL subframe configuration may be predetermined, for example, in order of the indexes of Table 2 or in order of a UL/DL subframe configuration having a large number of UL or DL subframes. In this case, since a UL/DL subframe configuration used as the reference UL/DL subframe configuration is predetermined, pattern information of the reference UL/DL subframe configuration which varies according to time may be transmitted by simply designating only time length used by each UL/DL subframe configuration.

In the above-described operation of dividing an entire time region into a time region in which subframe usage of the reference UL/DL subframe configuration should be maintained and a time region in which usage change is permitted, the unit of time region division may be one or more radio frames. That is, all eNBs in a group in a radio frame are regulated to perform resource allocation conforming to the reference UL/DL subframe configuration, whereas eNBs in another radio frame are permitted to use different UL/DL subframe configurations on the condition that an operation for solving interference with the reference UL/DL subframe configuration is performed. Even in this case, specific radio frames may be selected not to have the reference UL/DL subframe configuration so that each eNB may be permitted to arbitrarily perform a subframe configuration.

In a given reference UL/DL subframe configuration, a subframe location in which each eNB should maintain subframe usage of the reference UL/DL subframe configuration may differ according to a radio frame and a pattern of varying a subframe location in which subframe usage of the reference UL/DL subframe configuration should be maintained may be transmitted to neighboring eNBs.

In a situation in which a determined reference UL/DL subframe configuration is maintained during a predetermined time, a traffic situation in a group is accurately considered in an initial stage to which the reference UL/DL subframe configuration is applied. However, there may be a difference between an actual traffic situation in a group and the initial traffic situation over time. Therefore, it is desirable that, once the reference UL/DL subframe configuration is applied, relatively many subframes be configured as subframes that should maintain subframe usage of the reference UL/DL subframe configuration, whereas such subframes are desirably reduced over time so as to use different UL/DL subframe configurations in more subframes. Obviously, each eNB needs to perform the operation for solving an interference problem with the reference UL/DL subframe configuration.

As an example, once the reference UL/DL subframe configuration is updated, an initial radio frame is regulated to maintain subframe usage of the reference UL/DL subframe configuration, whereas the next radio subframe may be permitted to use different UL/DL subframe configurations under the condition that the operation for solving the interference problem with the reference UL/DL subframe configuration is performed.

<Third Embodiment>

As described above with reference to FIGS. 13 and 14, although an eNB having priority or a reference UL/DL subframe configuration may vary with time, the same principle may also be applied when the reference UL/DL subframe configuration differs according to frequency.

FIG. 15 illustrates an example of performing an interference mitigation operation according to a third embodiment of the present invention. Particularly, in FIG. 14, an eNB having priority is differently configured according to a frequency region in the example of FIG. 13. More specifically, it is assumed in FIG. 15 that an entire frequency region is divided into three regions and eNB1, eNB2, and eNB3 are prioritized in the three regions. Similar to FIG. 13, it is assumed that the three eNBs have the same UL/DL subframe configurations in subframes #0, #1, #2, #5, #6, #7, and #9.

In FIG. 15, eNB1 that uses UL/DL subframe configuration #1 does not perform an inter-cell mitigation operation in the first frequency region in which eNB1 is prioritized and performs a UL or DL operation as in a situation in which the three eNBs have the same UL/DL subframe configuration. In contrast, eNB1 performs UL reception or DL transmission in the second and third frequency regions in which eNB1 is not prioritized while performing a proper interference mitigation operation in consideration of interference with other eNBs. This operation is similarly applied to eNB2 and eNB3.

Although priority is given by dividing one carrier into units of a frequency, for example, the units of an RB in FIG. 15, this may be extended such that priority is assigned in units of a component carrier in the above-described carrier aggregation scheme.

FIG. 16 illustrates another example of performing an interference mitigation operation according to a third embodiment of the present invention. Particularly, in FIG. 16, the operation of varying the reference UL/DL subframe configuration over time, described in FIG. 14, is applied to a frequency region. It is assumed in FIG. 16 that an entire frequency region is divided into three regions and UL/DL subframe configurations #1, #2, and #6 in each frequency region correspond to reference UL/DL subframe configurations.

Each eNB discerns whether a reference UL/DL subframe configuration of each frequency region in each subframe is used for DL or UL. Although each eNB need not perform an additional interference mitigation operation when subframe usage is the same as usage designated in the reference UL/DL subframe configuration, the eNB should additionally perform the interference mitigation operation when subframe usage differs from usage designated in the reference UL/DL subframe configuration.

When the operations described with reference to FIGS. 15 and 16 are performed, a specific eNB may not use all frequency bands of a specific subframe without restriction. For example, when eNB1 of FIG. 15 performs a DL operation in subframe #4, eNB1 may perform high-power transmission in frequency region #1 in which eNB1 is prioritized. However, in the other frequency regions, eNB1 should reduce a transmit power or may not perform transmission.

This operation may impose limitations on transmission of a DL signal over all bands, wherein the DL signal may include a cell specific reference signal (CRS) or a channel state information reference signal (CSI-RS). In addition, a CSI interference measurement (CSI-IM) resource, which is a resource for measuring interference for CSI calculation by a UE, also appears over all bands.

If it is assumed that a UE transmits a specific signal at the same power in all bands in a corresponding subframe, measurement of the UE and an operation related to measurement may be erroneous. Accordingly, an eNB may transmit information indicating that a part of signals transmitted in all bands such as a CRS or a CSI-RS are transmitted at a low power in a specific frequency region of a specific subframe or not transmitted and information about a difference in a transmit power in the other cases. Upon receiving the information, the UE needs to detect a corresponding signal considering the difference in a transmit power and perform a related operation such as CSI reporting.

Even in the case of CSI-IM, the eNB may inform the UE that specific CSI-IM does not appear in a specific frequency region of a specific subframe and the UE may perform interference measurement only in a region in which corresponding CSI-IM appears and perform an operation for calculating CSI based on interference measurement.

A similar principle may also be applied to UL transmission. As an example, a signal such as a sounding reference signal (SRS) transmitted in all bands may be configured such that a transmit power of the SRS may differ according to a frequency region in a specific subframe and the SRS may not be transmitted in some frequency regions.

To easily determine the reference UL/DL subframe configuration in performing the above operation, each eNB may inform an eNB for determining the reference UL/DL subframe configuration or a cooperative eNB of a preferred DL or UL direction in each frequency region of each subframe. Alternatively, each eNB may inform an eNB for determining the reference UL/DL subframe configuration or a cooperative eNB of the ratio of DL or UL subframes used in each frequency region of each subframe and resource usage for actual data transmission and reception. Each eNB may update the reference UL/DL subframe configuration to a more proper configuration based on the above information.

<Fourth Embodiment>

In the fourth embodiment of the present invention, a specific example of adjusting a transmit power to a proper level when a specific eNB performs DL transmission in a subframe in which a neighboring eNB may perform UL reception will be described according to the above-described embodiments.

As described above, a neighboring eNB may perform UL reception at a time when a specific eNB performs DL transmission. If the time when the specific eNB performs DL transmission corresponds to the case in which priority is given to a UL operation or the eNB performing UL reception is prioritized for resource usage, the eNB performing DL transmission needs to adjust a transmit power so that the eNB performing UL reception with priority has no problem with operation. Hereinafter, a method in which eNB1 adjusts a DL transmit power when eNB0 performs UL reception and eNB1 performs DL transmission will be described.

First, eNB0 may set an interference level at which stable UL reception is performed. This level may be called a target interference level expressed as $I_{target}$. The target interference level may be defined as a value including signals functioning as interference such as interference from another cell, interference across another frequency band, and thermal noise. The target interference level may appear as an absolute power value or a relative value compared with the power of thermal noise. If the target interference level appears as the relative value compared with thermal noise, this may be called target interference over thermal noise (IoT) expressed as $I_{target}/P_{thermal}$ (where $P_{thermal}$ is a power value of thermal noise).

eNB1 may pre-transmit a predetermined RS and eNB0 may detect the RS to calculate a path loss value between the two eNBs. eNB1 may inform eNB0 of the transmit power of the RS and eNB0 may compare the receive power of the detected RS with a known transmit power to obtain the path loss value. Alternatively, if eNB0 informs eNB1 of the receive power of the RS, eNB1 may calculate the path loss value by comparing the receive power of the RS with the transmit power thereof. The calculated path loss value between the two eNBs is denoted as a PL.

If the target interference level and the PL are calculated, the transmit power of eNB1 may be set to a level at which interference affecting eNB0 does not exceed the target interference level. That is, $I_{target}/PL$ becomes a maximum transmit power that can be used by eNB1 at a time when eNB0 performs UL reception. For transmit power adjustment of eNB1, eNB0 may inform eNB1 of a target interference level of eNB0 via a backhaul link. Alternatively, if eNB1 calculates the PL between the two eNBs, eNB1 may inform eNB0 of the target interference level and the maximum transmit power of eNB1 calculated based on the PL only at a time when eNB0 performs UL reception.

Meanwhile, if there are two or more eNBs that create interference with respect to eNB0 in the above-described operation, interference exceeding the target interference level of eNB0 may occur. As an example, if a third eNB, eNB2, which creates interference with respect to eNB0 is present, the sum of two signals of eNB1 and eNB2 exceeds the target interference level of eNB0 even though eNB1 and eNB2 adjust powers so as not to exceed the target interference level of eNB0.

As one method for solving this problem, an upper limit of interference caused by an individual eNB is determined by dividing the target interference level of one eNB by the number of eNBs having the possibility of creating interference with respect to a corresponding eNB and each eNB may adjust a transmit power such that interference less than the upper limit, caused by an individual eNB, is applied. For example, each of eNB1 and eNB2 in the above case may adjust the transmit power thereof to appear as interference less than $I_{target}/2$ with respect to eNB0. In this case, even if the two eNBs simultaneously perform DL transmission, total interference arriving at eNB0 is maintained at a level less than the target interference level.

This may be generalized as follows. eNB0 needs to be aware of the number of eNBs influencing effective interference with respect to eNB0. This number of eNBs may be predetermined to be a specific value or may be calculated by detecting a unique signal transmitted by each eNB and regarding eNBs in which unique signals of a level exceeding a predetermined value are detected as eNBs that influence effective interference. If multiple eNBs are grouped into one group, the number of the other eNBs in a group to which the multiple eNBs belong may be the number of eNBs that influence effective interference.

Upon calculating the number of eNBs that influence effective interference according to the above method, eNBs that influence interference may be limited to eNBs that perform DL operation at a corresponding time. That is, eNBs performing a UL operation may be excluded even in a region in which eNBs influence effective interference. Assuming that the number of eNBs that influence effective interference identified by eNB0 is M, an upper limit of interference created by each eNB is given as $I_{target}/M$ and maximum powers transmitted by eNB1, eNB2, ..., eNBM are set to $I_{target}/(M*PL1)$, $I_{target}/(M*PL2)$, $I_{target}/(M*PLM)$, respectively. In this case, PL1, PL2, ..., PLM are path loss values from eNB0 to eNB1, eNB2, ..., eNBM, respectively.

In adjusting a DL transmit power on a resource in which a neighboring eNB may perform UL reception according to the above method, an additional upper limit or lower limit may be applied to a used transmit power. For example, when a specific eNB determines a transmit power on a specific resource according to information such as a target interference level of a neighboring eNB, the determined transmit power may be a very low value less than a minimum transmit power for performing DL transmission. In this case, the lower limit of the determined transmit power may be used or DL transmission may not be performed at a corresponding time by determining that DL transmission is impossible. If the determined transmit power is a very high value such that interference with respect to a neighboring system, for example, a system performing UL reception using a neighboring frequency band is excessive, the upper limit of the determined transmit power may be used.

Figure 17:
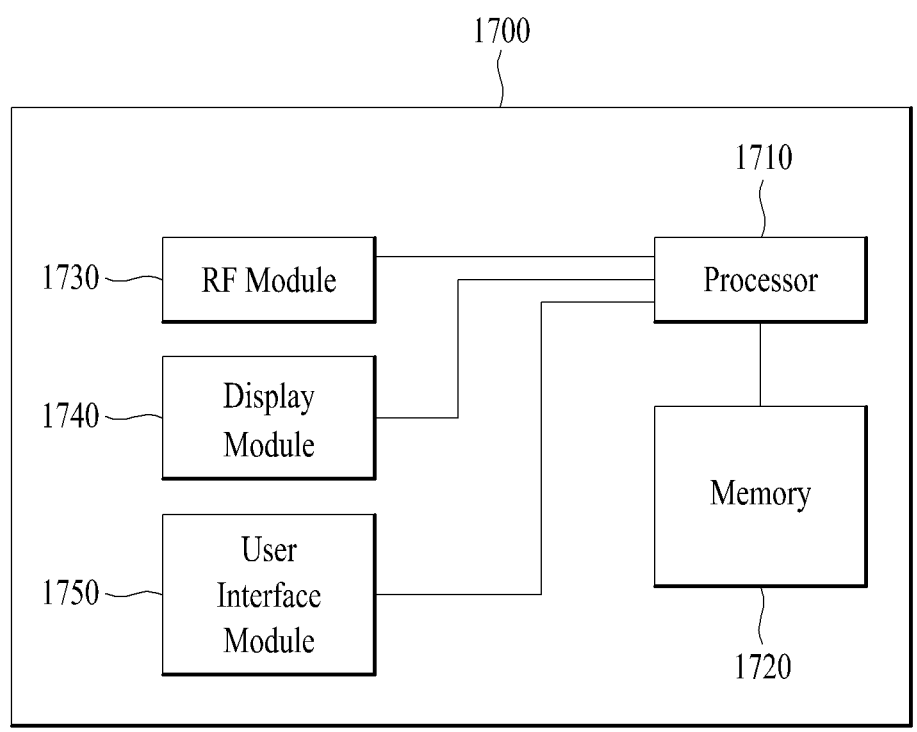
FIG. 17 is a block diagram for one example of a communication device according to one embodiment of the present invention.

FIG. 17 is a block diagram for one example of a communication device according to one embodiment of the present invention.

Referring to FIG. 17, a communication device 1700 includes a processor 1710, a memory 1720, an RF module 1730, a display module 1740 and a user interface module 1750.

The communication device 1700 is illustrated for clarity and convenience of the description and some modules can be omitted. Moreover, the communication device 1700 may further include at least one necessary module. And, some modules of the communication device 1700 can be further divided into sub-modules. The processor 1710 is configured to perform operations according to the embodiment of the present invention exemplarily described with reference to the accompanying drawings. In particular, the detailed operations of the processor 1710 can refer to the contents described with reference to FIGS. 1 to 16.

The memory 1720 is connected to the processor 1710 and stores an operating system, applications, program codes, data and the like. The RF module 1730 is connected to the processor 1710 and performs a function of converting a baseband signal to a radio signal or converting a radio signal to a baseband signal. For this, the RF module 1730 performs analog conversion, amplification, filtering and frequency uplink transform or inverse processes thereof. The display module 1740 is connected to the processor 1710 and displays various kinds of information. The display module 1740 can include such a well-known element as LCD (Liquid Crystal Display), LED (Light Emitting Diode), OLED (Organic Light Emitting Diode) and the like, by which the present invention is non-limited. The user interface module 1750 is connected to the processor 1710 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

While the interference mitigation method during dynamic usage change of a resource in a wireless communication system and an apparatus therefor have been described in the context of a 3GPP LTE system, the present invention is also applicable to various wireless communication systems in addition to the 3GPP LTE system.

The invention claimed is:

1. A method for transmitting and receiving a signal to and from a user equipment by a base station in a wireless communication system, the method comprising:
    applying, by the base station, a first resource configuration among at least one candidate resource configuration to the base station; and
    transmitting and receiving, by the base station, the signal to and from the user equipment in a first subframe according to the first resource configuration,
    wherein the base station is grouped together with at least one neighboring base station into one group,
    wherein a reference resource configuration is applied to a representative base station of the group,
    wherein each of the at least one candidate resource configuration and the reference resource configuration indicates an uplink-downlink configuration for subframes in a TDD Time Division Duplex) system,
    wherein, if the first subframe is indicated as a downlink subframe by the first resource configuration and is indicated as an uplink subframe by the reference resource configuration, a transmit power of a downlink signal transmitted in the first subframe is reduced, and
    wherein, if the first subframe is indicated as a uplink subframe by the first resource configuration and is indicated as a downlink subframe by the reference resource configuration, a transmit power of a uplink signal received in the first subframe is reduced.

2. The method according to claim 1, wherein the representative base station is changed in units of a predetermined resource.

3. The method according to claim 2, wherein the units of a predetermined resource are units of one or more time resources or units of one or more frequency resources.

4. A base station in a wireless communication system, the base station comprising:
    a wireless communication module configured to transmit and receive a signal to and from a user equipment; and
    a processor configured to control the wireless communication module,
    wherein the processor is further configured to:
        apply a first resource configuration among at least one candidate resource configuration to the base station, transmit and receive the signal to and from the user equipment in a first subframe according to the first resource configuration;

wherein the base station is grouped together with at least one neighboring base station into one group;

wherein a reference resource configuration is applied to a representative base station of the group;

wherein each of the at least one candidate resource configuration and the reference resource configuration indicates an uplink-downlink configuration for subframes in a TDD (Time Division Duplex) system;

wherein, if the first subframe is indicated as a downlink subframe by the first resource configuration and is indicated as an uplink subframe by the reference resource configuration, a transmit power of a downlink signal transmitted in the first subframe is reduced; and wherein, if the first subframe is indicated as an uplink subframe by the first resource configuration and is indicated as a downlink subframe by the reference resource configuration, a transmit power of a uplink signal received in the first subframe is reduced.

5. The base station according to claim 4, wherein the representative base station is changed in units of a predetermined resource.

6. The base station according to claim 5, wherein the units of a predetermined resource are units of one or more time resources or units of one or more frequency resources.

* * * * *